BRINKERHOFF & TAILOR.
Land-Roller.
No. 36,336. Patented Sept. 2, 1862.
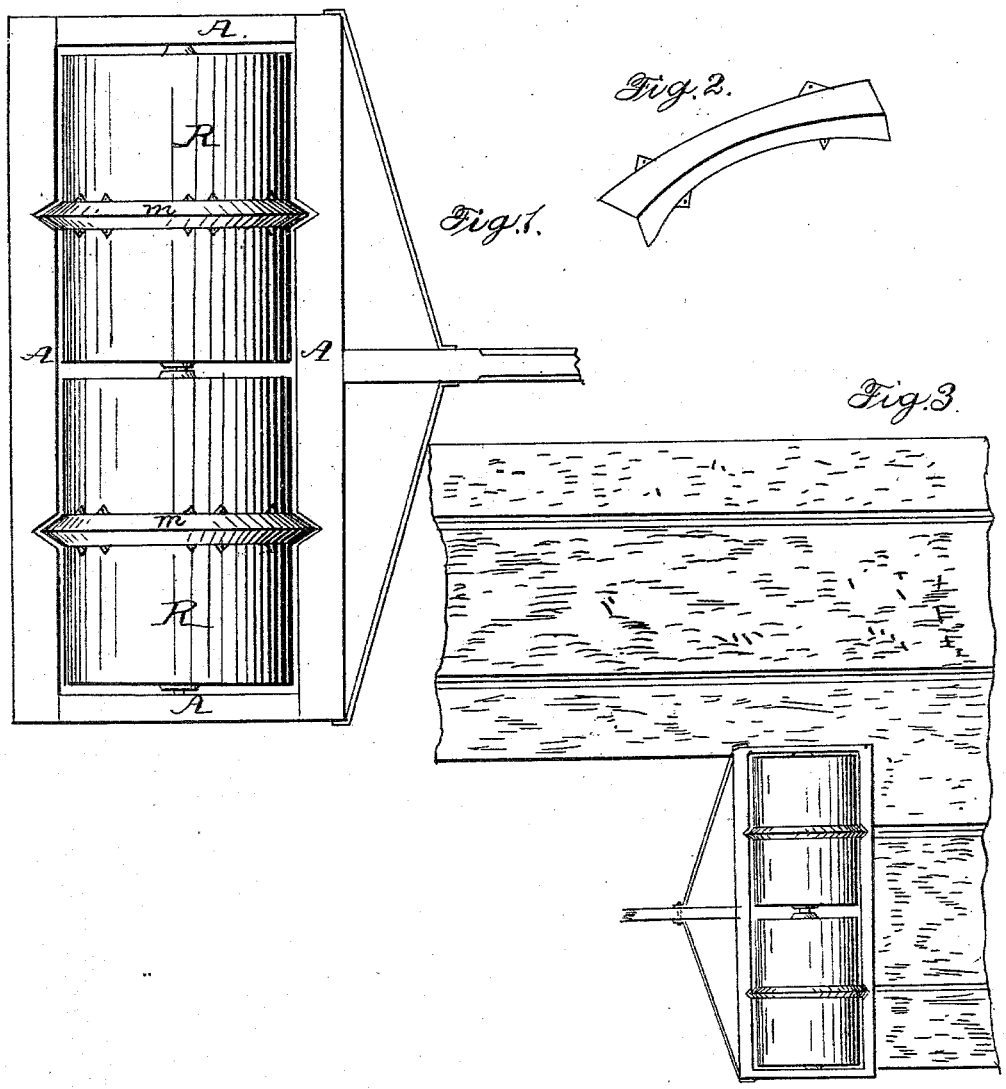

UNITED STATES PATENT OFFICE.

A. W. BRINKERHOFF AND A. J. FAILOR, OF UPPER SANDUSKY, OHIO.

IMPROVEMENT IN FIELD-ROLLERS.

Specification forming part of Letters Patent No. 36,336, dated September 2, 1862.

*To all whom it may concern:*

Be it known that we, ALEXANDER W. BRINKERHOFF and A. J. FAILOR, of Upper Sandusky, in the county of Wyandot and State of Ohio, have invented new and useful Improvements in Machinery for Preparing Ground for Planting Corn; and we do hereby declare that the following is a full, clear, and exact description of the same, reference being had to the annexed drawings, making a part of this specification, in which—

Figure 1 is a top view of the machine. Fig. 2 is a view of a section of the projecting marker. Fig. 3 is a view of the prepared ground, showing the machine as a guide for marking.

The nature of our invention consists in providing the periphery of field-rollers with a cast-iron projection directly around their centers, cast in sections, and applied in such a manner that the same may be removed when desired without impairing or removing any of the several parts of the frame-work, so that the same may readily be converted from a marker into an ordinary field-roller.

The construction of our machine consists in placing two rollers, R R, Fig. 1, upon an iron shaft, which passes through their centers, and is connected with the ends of frame A, which surrounds said rollers. Each of said rollers is made just the length that the marks for planting are desired to be apart, and the triangular projections for markers are placed exactly in their centers, thereby allowing just half the space between the markers at each end, so that in returning by letting the end of the roller reach just to the ground formerly rolled, the marks are all an exact distance apart, as seen in drawings, Fig. 3.

The markers M M are cast in sections, their inside circumference, when united, being the same as that of the outside of the rollers, and their form in section being that of an equilateral triangle, and are attached to the rollers by wood-screws, that they may be easily removed when desiring to use the roller for other purposes than marking; or, when the roller is used especially for marking ground, those projections may be cast on the centers of the rollers, or they may be cast in continuous rings, and be driven upon the roller's center and there confined by screws or bolts.

The frame A is so constructed as to effectually clean the rollers of adhering earth, with notches to receive the markers and to clear them of earth also.

Rollers have heretofore been used for the purpose of crushing clods and leveling the ground, thereby only preparing the ground for the marker, while by this arrangement we save all the time and labor of marking formerly necessary, and obtain for the agriculturist an implement in the use of which he saves time, instead of the loss of it, and which has prevented so many from adopting it for that reason.

With the use of this machine, after the ground is plowed, we can dispense with the use of the drag, and by passing once over it have the same in complete order and marked for cross-planting.

We do not claim providing rollers with a series of continuous projections around their periphery; nor do we claim providing the periphery of field-rollers with one or more surroundings of projecting teeth applied in sections, as such will not make the continuous mark necessary for planting, nor is such our invention; but,

Having thus fully described the nature, construction, and operation of this invention, what we claim as new and of our invention, is—

Applying directly to the centers of field-rollers, as nearly as we possibly can, a single projection cast in sections, but forming one continuous marker when applied to the roller, and attached or held in place by screws or bolts, whereby they may be easily applied to the roller for marking corn-ground, and as easily removed therefrom, leaving the roller in proper form for use on meadows, or for preparing other ground where smooth surface is desired, substantially as and for the purpose set forth.

A. W. BRINKERHOFF.
   A. J. FAILOR.

Witnesses:
 W. H. KIRBY,
 J. D. SEARS.